United States Patent [19]

Ohkawa

[11] 4,352,722
[45] Oct. 5, 1982

[54] INTEGRATED PHOTOVOLTAIC ELECTROLYTIC CELL

[75] Inventor: Tihiro Ohkawa, La Jolla, Calif.

[73] Assignee: General Atomic Company, San Diego, Calif.

[21] Appl. No.: 243,265

[22] Filed: Mar. 12, 1981

[51] Int. Cl.³ .............................................. C25B 1/04
[52] U.S. Cl. ..................................... 204/129; 204/248; 204/278; 204/DIG. 3; 136/251; 136/291
[58] Field of Search .............. 204/128, 129, 248, 278, 204/DIG. 3; 136/291; 429/111

[56] References Cited

U.S. PATENT DOCUMENTS

| | | | |
|---|---|---|---|
| 4,011,149 | 3/1977 | Nozik | 204/129 |
| 4,021,323 | 3/1977 | Kilby et al. | 204/129 |
| 4,061,555 | 12/1977 | Miyatani et al. | 204/242 |
| 4,076,904 | 2/1978 | Chen | 429/111 |
| 4,090,933 | 5/1978 | Nozik | 204/129 |
| 4,094,751 | 6/1978 | Nozik | 204/80 |
| 4,151,051 | 4/1979 | Evans | 204/86 |
| 4,160,816 | 7/1979 | Williams et al. | 423/648 R |
| 4,263,110 | 4/1981 | Meyerand | 204/128 |
| 4,263,111 | 4/1981 | Hooper et al. | 204/129 |

FOREIGN PATENT DOCUMENTS 2810913  9/1979  Fed. Rep. of Germany ...... 136/291

*Primary Examiner*—Aaron Weisstuch
*Attorney, Agent, or Firm*—Fitch, Even, Tabin, Flannery & Welsh

[57] ABSTRACT

A photovoltaic-electrolytic unit is provided to produce an electric current from solar energy and utilize the current to produce hydrogen by the electrolysis of water. The unit floats in an aqueous medium so that photoelectric cells are exposed to solar radiation, and electrodes submerged in the medium produce oxygen which is vented and hydrogen which is collected in the unit.

16 Claims, 11 Drawing Figures

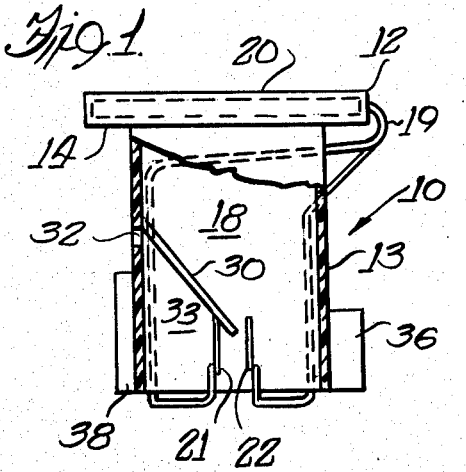
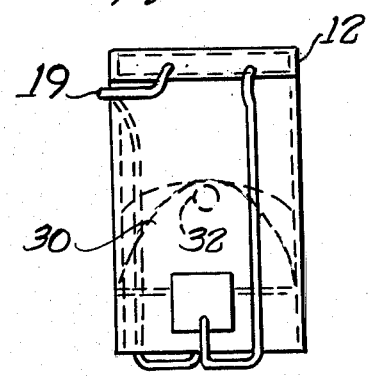
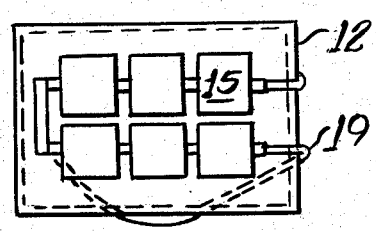
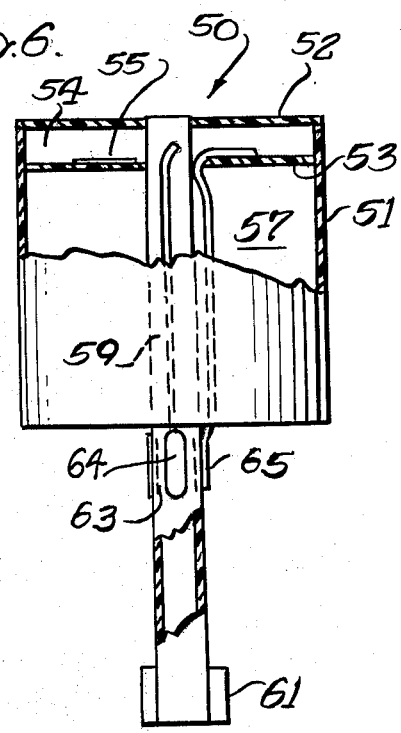
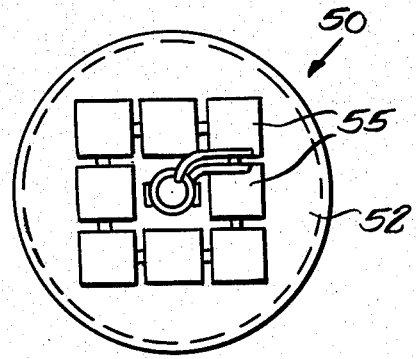
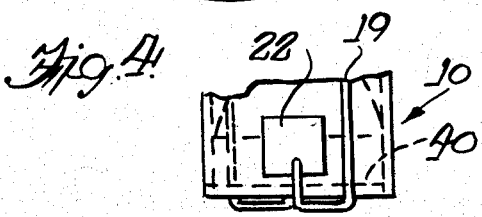
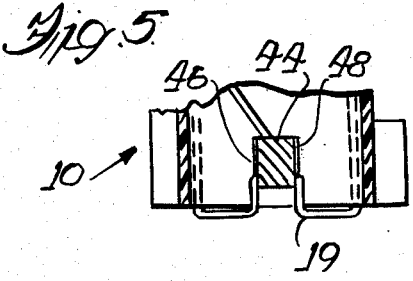

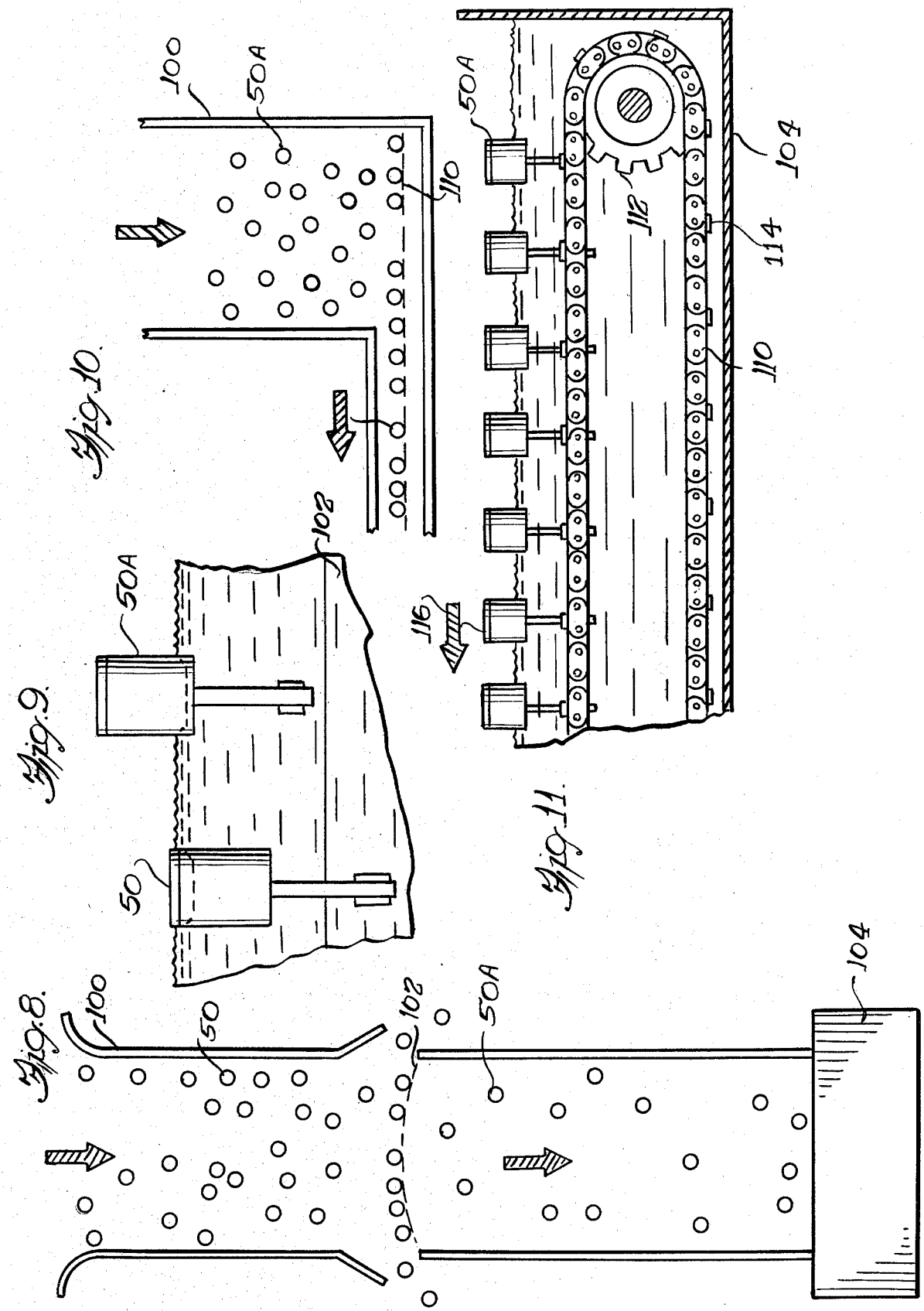

INTEGRATED PHOTOVOLTAIC ELECTROLYTIC CELL

BACKGROUND OF THE INVENTION

The harnessing of solar energy is often mentioned as a partial solution to the world's energy problems because an enormous amount of solar energy reaches the earth's surface every day. Practical problems, however, have limited the harnessing of the sun's energy for use as electrical or chemical power to run machinery. While the total sun's energy reaching the earth at any one time is tremendous, the amount reaching any specific area is relatively small. In order therefore to collect solar energy in significant amounts, it must be collected over a large surface area so a solar energy collection facility will cover a large area. Additional problems in making solar energy practical include the fact that while the sun's energy can be gathered by thermal receptors, concentrating the heat is difficult. While solar energy has been utilized efficiently where a moderate heat reservoir is required, e.g., hot water in homes, generators for electricity require large temperature differences between a high temperature reservoir and a low temperature reservoir to operate efficiently.

The photovoltaic cell has long been known as a device for converting light rays to electricity. The use of photovoltaic cells, except in specialized applications, has not been practical for the production of electricity because it produces direct current at low voltage and does so inconsistently, i.e. primarily when the sun shines.

An alternative solution is to convert photoelectric energy to chemical energy, and one way to do this is by using electricity produced by photoelectric cells to produce hydrogen from the electrolysis of water. Hydrogen so produced may be used as an energy source in fuel cells or as a clean, burnable fuel which produces only water when burned. By converting photoelectric energy to storable hydrogen, a consistent source of energy is provided which is independent of the variations in available light. A solar energy to hydrogen conversion system can be set up anywhere, and although the amount of energy produced is, of course, dependent on the available sunlight, energy can potentially be provided at a location near the site where the energy is to be utilized.

The problem remains, however, that a large surface area is necessary for the conversion of the sun's energy into electricity and thereafter to hydrogen by electrolysis. A facility for producing significant amounts of hydrogen would require tremendous areas. The large surface areas covered could make maintenance problems difficult, and a widely spread grid of solar receptors would be subject to damage by the elements.

SUMMARY OF THE INVENTION

It is an object of the invention to utilize solar energy to produce hydrogen in an economically feasible manner through the use of miniature self-contained photovoltaic electrolysis units which may be spread over a large area.

The present invention achieves this goal by converting sunlight to electricity and in turn to hydrogen by means of discrete units which float on the surface of a body of water. The top surface of each unit includes a plurality of photovoltaic cells connected in series to convert solar energy into electricity. A cathode and an anode are connected to the cells and placed so as to be in constant contact with the water in which the unit floats. Oxygen collected at the anode is allowed to escape, but the hydrogen bubbles produced at the cathode are collected by means of a container which may take a form similar to an inverted cup. The floating units, after being filled with hydrogen, are collected and the hydrogen therein harvested.

BRIEF DESCRIPTION OF THE INVENTION

FIG. 1 is a front elevation view of a floatable photovoltaic electrolysis unit embodying various features of the invention;

FIG. 2 is a side elevation view of the unit as shown in FIG. 1;

FIG. 3 is a plan view showing the photoelectric cell box portion of the unit of FIG. 1;

FIG. 4 is a fragmentary view, similar to FIG. 2 of an alternative embodiment of such a unit;

FIG. 5 is a fragmentary view, similar to FIG. 1 of another alternative embodiment of such a unit;

FIG. 6 is an elevation view of still another alternative embodiment of a photovoltaic electrolysis unit;

FIG. 7 is a plan view of the embodiment of FIG. 6;

FIG. 8 is a plan view of a channel leading to a collection facility for units such as those shown in FIGS. 4 and 5, having a submerged barrier to separate filled from unfilled units;

FIG. 9 is an underwater view of such a barrier;

FIG. 10 is a perspective view of a channel flowing to a collection device;

FIG. 11 is a perspective view of units attached magnetically to a submerged endless belt which carries the units to a harvesting facility.

In FIG. 1 is illustrated a photovoltaic-electrolysis unit 10 which converts sunlight to electricity, utilizes the electricity to produce hydrogen from water by electrolysis and collects the hydrogen so produced. The body of the unit 10 includes a plastic box or compartment 12, which serves as a housing for the photovoltaic circuitry, and a hollow cylindrical wall 13 extending downward from the undersurface of the box to form therewith a bubble chamber 18 wherein hydrogen is collected. The plastic box 12 houses and totally encloses a plurality of photovoltaic cells 15 except for ports through which wire leads 19 pass. The box as shown is rectangular, but may be of any suitable shape such as circular or elliptical. A dome shaped top is especially suitable for collecting sun rays early and late in the day when the sun is low in the sky. The ports around the leads 19 are sealed to make the box fluid-tight to prevent water from reaching and possibly corroding the cells 15.

Air trapped in the box 12 provides buoyancy and helps to float the unit 10 in water and to maintain the box 12 at the top of the unit 10 when the unit 10 is floating. At least the top or lid portion 20 of the box 12 is made of clear or translucent plastic to allow sunlight to pass through to reach the cells 15. A strong, durable plastic, as for example, polymethylmethacrylate is used to give the unit 10 long life.

A plurality of photovoltaic cells 15 are supported on the bottom inside surface of the box 12. To increase the efficiency of the unit, the photovoltaic cells 15 should cover as much of the horizontal area of the box 12 as possible. The cells 15 may be silicon photovoltaic cells or other types known in the art. The choice of photovoltaic cell depends upon the cost of the cells and their efficiency since the cost of the cells 15 comprise the major expense of the units 10.

Silicon cells will each produce about 0.45 volts, and the illustrated box 12 contains six cells 15 connected in series to produce a voltage of approximately 2.7 volts. Theoretically, at least 1.2 volts is needed to effect the electrolysis of water, but because of internal impedance, practically, at least 1.4 volts and preferably greater than 1.6 volts are needed. If more cells 15 are employed than six, as for example, eight, some may be connected in series and some in parallel to assure a continual current even at low light levels. The wire leads 19 enter the bubble chamber 18 through holes in the wall 13 which must be sealed to maintain fluid integrity of the region of the chamber so that hydrogen gas produced therein will be trapped. An anode 21 and a cathode 22 are attached to the ends of the wire leads 19.

When the unit 10 is placed in water, it is first inverted to fill the bubble chamber 18 with water. The anode 21 and the cathode 22 in the bubble chamber 18 are therefore in contact with water. Electricity is produced by the cells 15 when the cells 15 receive sunlight. Hydrogen is produced at the cathode 22 and oxygen at the anode 21 according to the well known electrolysis reaction:

Cathode: $4e^- + 4H_2O \rightarrow 2H_2 + 4OH^-$ $4OH^- \rightarrow 2H_2O + O_2 + 4e^-$ Overall: Elect. Energy $+ 2H_2O + 2H_2 + O_2 + $ Heat Although pure oxygen, a valuable commodity, is produced by the reaction, it is discarded as the collection of relatively small amounts of oxygen is not economically feasible, and attempts to recover both gases would complicate hydrogen harvesting operations. For this reason, a flat baffle 30, the plane of which is acute to the cylindrical axis, is placed above the anode to span an arc of the interior surface of the wall 13 to direct oxygen through an orifice 32 in the cylindrical wall 13. Thus, the baffle creates a subchamber 33 which is vented to the exterior of the unit through the orifice 32.

Hydrogen, which forms at the cathode, bubbles upward to the top of the main chamber 18 and collects thereat. As hydrogen is formed, the unit 10 will acquire increased buoyancy and will float higher in the water. Should the unit 10 turn on its side, the hydrogen collected would be lost since the bottom end of the unit is open to allow free ingress and egress of water. For this reason the bottom end is weighted with ballast 36 which stabilizes the unit so that the box 12 is always on top. A portion of the unit 10 may be a magnet 38 which can be used to attach to another magnet or to a ferromagnetic substance to assist in gathering the units for harvesting or collecting the hydrogen generated.

The anode 21 and cathode 22 may be made of platinum, which has good conductive properties and does not corrode. Of course, platinum is expensive, and other electrode materials may be used which have relatively noncorrosive properties in the electrolysis reaction. Nickel may replace platinum in a suitable anode 21. However, a nickel cathode may quickly deteriorate. Electrodes should have sufficient surface area so that bubble buildup thereon does not create significant resistance to cause the unit to function poorly, and an electrode surface area of at least 1 cm$^2$ is preferred.

The aqueous solution in which the units 10 are floated should have sufficient ionic strength as to allow sufficient electric current to pass between the anode and cathode. Distilled water allows little electrolysis to take place and hence is unsuitable; however, sea water has sufficient ionic strength to allow good production of hydrogen. Alternatively, fresh water of sufficient mineral concentration to have a significant ionic strength may be suitable for electrolysis. If sufficient ionic strength does not occur naturally in the flotation pond, such chemicals as sodium chloride or sodium hydroxide may be added to provide the pond with the needed ionic strength.

One alternative is shown in FIG. 4 wherein a suitable salt solution is provided within the chamber 18 by closing its bottom with a semipermeable membrane 40. As electrolysis occurs, the membrane 40 permits passage of replacement water therethrough but retains the dissolved salt.

Another alternative to facilitate fresh water use of the unit is shown in FIG. 5 wherein a solid polymer electrolyte 44 is incorporated into the unit. Because the polymer electrolyte 44 is sufficiently conducting there is no ionic strength requirement for the water. An anode 46 and a cathode 48 are provided in contact with the electrolyte 44 as by plating the electrode material directly onto two surfaces of the solid electrolyte.

Because the units 10 are small, e.g. the chamber 18 may have an outside diameter of 2 inches and a body height of 2 inches, only a relatively small volume of hydrogen can be collected in each unit 10. However, the intention is to employ a multitude of such units 10 to produce a large volume overall. The units 10 are individually sturdy, and when floating in water create a system that is relatively unaffected by the elements. Even in very rough water, buffeting of the units might result only in a partial loss of hydrogen gas, although proper ballasting should minimize such a loss.

In a farm pond or in a sheltered area of ocean water, the units should be relatively indestructible and long-lived because photovoltaic cells have an average life of at least three years of continuous use. Because each unit has its own circuitry, one would not have to search a large grid pattern to find a malfunctioning unit. In fact, malfunctioning units are easily detected because units which do not produce hydrogen remain floating low in the water whereas functioning units rise as they gain buoyancy. Periodically, non-producing units can be removed from the pond and discarded or repaired. However, it is important to note that the breakdown of a small number of individual units should not seriously affect the overall hydrogen production system.

FIG. 6 shows still another alternative embodiment of a photovoltaic unit 50 having a body formed by a cylindrical wall 51 and a circular top surface 52. A circular wall 53 divides the body into an upper photovoltaic compartment 54, in which the photovoltaic cells 55 are contained, and a lower bubble chamber 57. The unit 50 contains eight photovoltaic cells 55, all eight of which can be connected in series, or alternatively two series of four cells may be connected in parallel to each other.

A central tube 59 passes through the photovoltaic compartment 54 and extends downward well below the cylindrical wall 51. Ballast 61 at the end of the tube 59 maintains the floating unit 50 in desired vertical orientation. At a location below the lower edge of the wall 51, the tube 59 is provided with slot 64 for admitting the aqueous solution in which the unit 50 floats. An anode 63 is located inside the tube 59 and a cathode 65 partially surrounds the tube. Oxygen produced at the anode flows up through the tube and is vented through the open top. Hydrogen bubbles up around the exterior of the tube 59 and is retained in the bubble chamber 57.

In order to gather the units to harvest the hydrogen, they may be floated to a gathering facility by producing a slight current or by making use of natural currents, such as tidal currents in the ocean or a gentle stream current in a dam-created pond. It may be possible to launch the units a sufficient distance upstream so that they will be filled with hydrogen by the time they reach a gathering facility located downstream.

The buoyancy gained by the hydrogen-filled units is used to differentiate filled and unfilled units in a continuous gathering arrangement illustrated in FIGS. 8 and 9. Units 50 are directed through a channel 100 toward a collection facility 104. A barrier 102 is constructed at a desired distance below the water surface which will allow sufficiently filled units 50A to pass thereover to reach the collection facility 104. The barrier 102 may be curved so as to deflect units 50 which have not created enough hydrogen to be sufficiently buoyant and direct them along a path where there will be time for further hydrogen generation before they return to the channel 100.

As previously mentioned, units which include a magnet member as ballast may be harvested at a facility in which the magnets in the units are attracted to magnets or ferromagnetic members in the collection facility.

In FIG. 10 is illustrated a plurality of units 50 wherein the ballast 61 includes a magnet. The units 50 float through a channel 100 to a collection facility 104 where the floating units 50 contact a continuous submerged chain 110. The chain is driven around sprocketed wheels 112. The chain 110 as shown in FIG. 11 is oriented in a vertical plane so that the upper part of the chain 110 is submerged at a level generally at the level of the magnetic ballast in a hydrogen filled unit. The chain may alternatively be oriented in a horizontal plane and submerged generally at the level of the ballast 61. The height of the chain may be adjustable to allow for water level changes.

A plurality of magnetically attractive members 114 are provided on the chain 110 to attract the magnetic ballast 61 on the units 50. The members 114 may be magnets or alternatively may be composed of ferromagnetic material to which the magnets in the units may attach.

The chain 110 carries the gathered units in the direction 116 of the arrow in FIG. 11 to a hydrogen storage chamber (not shown) where the units are inverted to release the hydrogen therefrom.

As the hydrogen is already separated from the oxygen when the units reach the gathering facilities, no purification facilities are required for the hydrogen. The hydrogen after harvesting may be stored in pressurized tanks or may be stored in tanks containing metal which absorbs large amounts of hydrogen in hydride form.

EXAMPLE I

Ten units, each having eight silicon cells connected in series, are floated in a sheltered area of ocean water which is enclosed to retain the units. Each of the units has a platinum anode and cathode, each with a 1 cc surface area, and the electrodes are spaced approximately 5 cm apart. The test is run on a clear summer day between sunrise and sunset, which is equivalent to about 7 hours of noontime sun.

The bubble container of each unit is calibrated so that the volume of hydrogen collected can be measured visually. The total volume of hydrogen collected from the ten units during the day is 860 cc, giving an average hydrogen production per unit of 86 cc, measured at 1 atmosphere and a temperature of 25° C.

EXAMPLE II

Ten units, similar to those in Example I but utilizing a solid polymer electrolyte as generally depicted in FIG. 5, are floated in a fresh water pond from sunrise until sunset on a summer day which remains clear throughout. For a current of 32 milliampere during the noontime sun, the total volume of hydrogen collected during the day is 940 cc, giving an average volume collected per unit of 94 cc measured at 1 atmosphere and a temperature of 25° C.

If the units of Example I each have an exterior diameter of 2 inches, approximately 1 million of such units may be floated on a one-acre pond or in a one-acre enclosure of ocean water, and a million such units will produce 86,000 liters of hydrogen (STP) on a sunny summer day in each acre of water surface. Assuming that 11,011 liters of hydrogen gas contain the energy equivalent of a gallon of gasoline, then on a sunny day, these units floating on one acre of water surface can produce the equivalent of 7.8 gallons of gasoline.

Although the invention has been described with regard to certain preferred embodiments, modifications as would be obvious to one having the ordinary skill in this art may be made without departing from the scope of the invention which is defined in the appended claims. Various features of the invention are emphasized in the following claims.

I claim:

1. A unit for producing hydrogen gas with solar energy, comprising:
   flotation means to buoy said unit in an aqueous medium;
   stabilization means to maintain a vertical orientation of said floating unit;
   solar ray receiving means located at the top of said unit when said unit is floated which includes a plurality of interconnected photovoltaic cells, positioned to receive sun's rays and interconnected to produce electrical potential of at least about 1.4 volts;
   a gas bubble collection chamber with means to admit therein the medium oriented below the surface of the medium when said unit floats therein;
   an anode and a cathode; and
   means respectively connecting said anode and said cathode to positive and negative terminals of said photovoltaic cells;
   said cathode being positioned for contact with the aqueous medium at a location where hydrogen bubbles produced by the electrolysis of water resulting from the electrical potential created by said photovoltaic cells are trapped in said collection chamber.

2. A unit according to claim 1 also including means for venting oxygen produced at said anode by the electrolysis of water from said unit.

3. A unit for producing hydrogen gas according to claim 2 wherein said vent means comprises a baffle within said collection chamber which creates a subchamber located directly above said anode and an orifice in the subchamber outer wall vents oxygen from said unit.

4. A unit for producing hydrogen gas with solar energy according to claim 1 wherein said flotation means includes a liquid-tight compartment wherein said solar ray receiving means is located.

5. A unit for producing hydrogen gas according to claim 4 wherein said compartment has a transparent top.

6. A unit for producing hydrogen gas according to claim 4 wherein said collection chamber comprises a bottom surface of said compartment and a cylindrical wall depending therefrom.

7. A unit for producing hydrogen gas according to claim 4 wherein:
said compartment comprises an upper section of a cylindrical wall, a floor, and a ceiling,
said chamber comprises a lower section of said cylindrical wall and a bottom surface of said floor;
an open ended tube passes through said chamber and extends below said cylindrical wall;
said cathode is located outside of said tube;
said anode is located inside said tube, oxygen produced thereat venting through said tube; and
a slot means provided in said tube between said anode and said cathode communicates aqueous medium therebetween.

8. A unit for producing hydrogen gas according to claim 7 wherein said stabilization means comprises ballast means provided at the bottom of said tube.

9. A unit for producing hydrogen gas according to claim 1 wherein said unit includes a magnetic member which is adapted to attach to a magnet attracting member in a multi unit-gathering facility.

10. A unit according to claim 1 wherein said collection chamber also includes a semipermeable membrane which separates said collection chamber from the medium and admits water therethrough;
and an ionically conductive solution contained in said collection chamber which will not pass through said membrane.

11. A unit according to claim 1 wherein a solid polymer electrolyte connects said anode with said cathode.

12. A unit according to claim 11 wherein said anode and said cathode are plated on said polymer electrolyte.

13. A method for producing hydrogen gas from an aqueous medium comprising:
disposing a plurality of floatable photovoltaic-electrolysis units in an aqueous medium, each of which units includes a gas bubble collection chamber;
exposing said units to the sun's rays and collecting hydrogen created by electrolysis of water in said collection chambers;
gathering said units at a hydrogen harvesting facility, following collecton of at least a minimum desired amount of hydrogen in each unit, and
harvesting the hydrogen from said units.

14. A method according to claim 13 wherein said units are gathered at the harvesting facility by subjecting said units to a current flowing toward the facility.

15. A method according to claim 13 wherein those of said units sufficiently filled with hydrogen are separated for gathering from those of said units insufficiently filled with hydrogen by floating said hydrogen-filled units over a barrier located just below the surface of the aqueous medium which prevents passage of units insufficiently filled with hydrogen.

16. A method according to claim 13 wherein oxygen produced by electrolysis is vented from said units.

* * * * *